(12) United States Patent
Guthrie et al.

(10) Patent No.: US 10,339,009 B2
(45) Date of Patent: *Jul. 2, 2019

(54) SYSTEM FOR FLAGGING DATA MODIFICATION DURING A VIRTUAL MACHINE BACKUP

(71) Applicant: International Business Machines Corporation, Armonk, NY (US)

(72) Inventors: Guy Lynn Guthrie, Austin, TX (US); Naresh Nayar, Rochester, MN (US); Geraint North, Manchester (GB); Hugh Shen, Round Rock, TX (US); William Starke, Round Rock, TX (US); Phillip Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,236

(22) Filed: Aug. 22, 2018

(65) Prior Publication Data

US 2018/0357129 A1    Dec. 13, 2018

Related U.S. Application Data

(63) Continuation of application No. 14/903,833, filed as application No. PCT/IB2014/062822 on Jul. 3, 2014.

(30) Foreign Application Priority Data

Jul. 11, 2013   (GB) .................................. 1312417.7

(51) Int. Cl.
*G06F 12/00*        (2006.01)
*G06F 11/14*        (2006.01)
(Continued)

(52) U.S. Cl.
CPC .......... *G06F 11/1451* (2013.01); *G06F 3/065* (2013.01); *G06F 3/0619* (2013.01);
(Continued)

(58) Field of Classification Search
CPC ......... G06F 9/45558; G06F 2009/4557; G06F 11/1484; G06F 11/151; G06F 2212/1032;
(Continued)

(56) References Cited

U.S. PATENT DOCUMENTS 5,287,508 A    2/1994  Hejna, Jr. et al.
5,428,761 A    6/1995  Herlihy et al.
(Continued)

FOREIGN PATENT DOCUMENTS

GB          2272549 A        5/1994

OTHER PUBLICATIONS

Wikipedia, *Simultaneous multithreading*, Wikipedia.org (online), accessed Oct. 14, 2015, 5 pages, URL: en.wikipedia.org/wiki/Simultaneous_multithreading.
(Continued)

*Primary Examiner* — Arvind Talukdar
(74) *Attorney, Agent, or Firm* — Jason H. Sosa

(57) ABSTRACT

A computer system comprises a processor unit arranged to run a hypervisor running one or more virtual machines; a cache connected to the processor unit and comprising a plurality of cache rows, each cache row comprising a memory address, a cache line and an image modification flag; and a memory connected to the cache and arranged to store an image of at least one virtual machine. The processor unit is arranged to define a log in the memory and the cache further comprises a cache controller arranged to set the image modification flag for a cache line modified by a virtual machine being backed up, but not for a cache line modified by the hypervisor operating in privilege mode; periodically check the image modification flags; and write only the memory address of the flagged cache rows in the defined log.

10 Claims, 8 Drawing Sheets

(51) Int. Cl.

| | |
|---|---|
| *G06F 12/0806* | (2016.01) |
| *G06F 9/455* | (2018.01) |
| *G06F 12/0875* | (2016.01) |
| *G06F 12/109* | (2016.01) |
| *G06F 11/20* | (2006.01) |
| *G06F 3/06* | (2006.01) |
| *G06F 12/0804* | (2016.01) |
| *G06F 12/0891* | (2016.01) |
| *G06F 12/12* | (2016.01) |

(52) U.S. Cl.
CPC .......... *G06F 3/0652* (2013.01); *G06F 3/0685* (2013.01); *G06F 9/45558* (2013.01); *G06F 11/1438* (2013.01); *G06F 11/1484* (2013.01); *G06F 11/2097* (2013.01); *G06F 12/0804* (2013.01); *G06F 12/0806* (2013.01); *G06F 12/0875* (2013.01); *G06F 12/0891* (2013.01); *G06F 12/109* (2013.01); *G06F 12/12* (2013.01); *G06F 11/2023* (2013.01); *G06F 2009/45583* (2013.01); *G06F 2009/45591* (2013.01); *G06F 2201/885* (2013.01); *G06F 2212/1032* (2013.01); *G06F 2212/152* (2013.01); *G06F 2212/281* (2013.01); *G06F 2212/313* (2013.01); *G06F 2212/60* (2013.01); *G06F 2212/608* (2013.01)

(58) Field of Classification Search
CPC ............... G06F 11/1451; G06F 9/4856; G06F 12/0804; G06F 2212/152; G06F 9/45533
See application file for complete search history.

(56) References Cited

U.S. PATENT DOCUMENTS

| | | | |
|---|---|---|---|
| 5,666,514 A | | 9/1997 | Cheriton |
| 5,893,155 A | | 4/1999 | Cheriton |
| 5,974,438 A | | 10/1999 | Neufeld |
| 6,493,801 B2 | | 12/2002 | Steely, Jr. et al. |
| 6,681,293 B1 | | 1/2004 | Solomon et al. |
| 6,938,252 B2 | | 8/2005 | Baylor et al. |
| 8,275,942 B2 | | 9/2012 | Yigzaw et al. |
| 8,312,239 B2 | | 11/2012 | Bentley et al. |
| 8,812,907 B1 * | | 8/2014 | Bissett ................ G06F 11/1484 714/20 |
| 8,832,390 B1 | | 9/2014 | Ahmad et al. |
| 9,201,612 B1 * | | 12/2015 | Vincent ................ G06F 3/0662 |
| 9,880,905 B2 | | 1/2018 | Guthrie et al. |
| 9,886,350 B2 | | 2/2018 | Guthrie et al. |
| 2004/0162950 A1 * | | 8/2004 | Coulson .............. G06F 12/0804 711/141 |
| 2004/0194096 A1 | | 9/2004 | Armstrong et al. |
| 2006/0150010 A1 | | 7/2006 | Stiffler et al. |
| 2006/0242442 A1 | | 10/2006 | Armstrong et al. |
| 2006/0253682 A1 | | 11/2006 | Armstrong et al. |
| 2011/0153926 A1 | | 6/2011 | Fang et al. |
| 2011/0208908 A1 | | 8/2011 | Chou et al. |
| 2014/0095821 A1 * | | 4/2014 | Yang ................. G06F 17/30091 711/162 |
| 2014/0281131 A1 * | | 9/2014 | Joshi ................... G06F 12/0804 711/103 |
| 2014/0344504 A1 * | | 11/2014 | Luo ..................... G06F 12/0842 711/103 |
| 2016/0154663 A1 | | 6/2016 | Guthrie et al. |
| 2016/0170881 A1 | | 6/2016 | Guthrie et al. |
| 2016/0210197 A1 | | 7/2016 | Guthrie et al. |
| 2016/0217045 A1 | | 7/2016 | Guthrie et al. |
| 2018/0067816 A1 | | 3/2018 | Guthrie et al. |
| 2018/0074911 A1 | | 3/2018 | Guthrie et al. |

OTHER PUBLICATIONS

Cully et al., *Remus: High Availability via Virtual Machine Replication*, Proceedings of the 5th USENIX Symposium on Networked Systems Design and Implementation (NSDI'08), Apr. 2008, pp. 161-174, USENIX Association Berkeley, CA, USA.

U.S. Appl. No. 16/108,583, to Guy Lynn Guthrie et al., entitled, *Virtual Machine Backup*, assigned to International Business Machines Corporation, 31 pages, filed Aug. 22, 2018.

U.S. Appl. No. 16/106,764, to Guy Lynn Guthrie et al., entitled, *Virtual Machine Backup*, assigned to International Business Machines Corporation, 40 pages, filed Aug. 21, 2018.

GB920130027US03, Appendix P; List of IBM Patent or Applications Treated as Related, Dec. 12, 2018, 2 pages.

International Search Report and Written Opinion, PCT/IB2014/062822, dated Nov. 18, 2014, 7 pages.

* cited by examiner

SYSTEM FOR FLAGGING DATA MODIFICATION DURING A VIRTUAL MACHINE BACKUP

CLAIM OF PRIORITY

This application is a continuation application of and claims priority from U.S. patent application Ser. No. 14/903,833, filed Jan. 8, 2016, which is a 371 of International Application PCT/IB2014/062822, filed Jul. 3, 2014, which claims priority from GB Patent Application No. 1312417.7, filed Jul. 11, 2013.

FIELD OF THE INVENTION

The present invention relates to methods, computer systems, and computer program products for data processing.

BACKGROUND

Virtualization is commonly applied on computer systems to improve the robustness of the implemented computing architecture to faults and to increase utilization of the resources of the architecture. In a virtualized architecture, one or more processor units, for example processors and/or processor cores, of the computer system act as the physical hosts of virtual machines (VMs), which are seen by the outside world as independent entities. This facilitates robustness of the architecture to hardware failures, as upon a hardware failure, a VM previously hosted by the failed hardware may be passed over to another host, without the user of the virtual machine becoming aware of the hardware failure. This concept is an important facilitator of so-called 'high availability' of a service provided by such a VM.

Implementing a switch between two different hardware resources as a result of a failure is not a trivial task, as the VM ideally should be relaunched in a state that is identical to the state of the VM at the point of the hardware failure to avoid inconvenience to the user. In one approach, this is provided by running multiple copies of a single VM in lock-step on different entities, for example different physical servers, such that upon the failure of one entity another entity can take over the responsibility for hosting the VM. A significant drawback of such lock-step arrangements is that processing resources are consumed by a failover copy of a VM, thus reducing the available bandwidth of the system, i.e. reducing the total number of VMs that can be hosted by a system.

In another approach commonly found in commercial products, a physical host responds to a failure of another physical host by simply rebooting the VM from a shared disk state, for example a shared image of the VM. This however increases the risk of disk corruption and the loss of the exposed state of the VM altogether.

A different failover approach is disclosed in "Remus: High Availability via Virtual Machine Replication" by Brendan Cully et al. in NSDI'08 Proceedings of the 5th USENIX Symposium on Networked Systems Design and Implementation, 2008, pages 161-174. In this approach, all VM memory is periodically marked as read only to allow for changes to the VM memory to be replicated in a copy of the VM memory on another host. In this read-only state, a hypervisor is able to trap all writes that a VM makes to memory and maintain a map of pages that have been dirtied since the previous round. Each round, the migration process atomically reads and resets this map, and the iterative migration process involves chasing dirty pages until progress can no longer be made. This approach improves failover robustness because a separate up-to-date image of the VM memory is periodically created on a backup host that can simply launch a replica of the VM using this image following a hardware failure of the primary host.

However, a drawback of this approach is that as the VM remains operational during the read-only state of its VM memory, a large number of page faults can be generated. In addition, this approach does not allow for the easy detection of which portion of a page has been altered, such that whole pages must be replicated even if only a single bit has been changed on the page, which is detrimental to the overall performance of the overall architecture, as for instance small page sizes have to be used to avoid excessive data traffic between systems, which reduces the performance of the operating system as the operating system is unable to use large size pages.

U.S. Pat. No. 5,893,155 discloses a digital computer memory cache organization implementing efficient selective cache write-back, mapping and transferring of data for the purpose of roll-back and roll-forward of, for example, databases. Write or store operations to cache lines tagged as logged are written through to a log block builder associated with the cache. Non-logged store operations are handled local to the cache, as in a writeback cache. The log block builder combines write operations into data blocks and transfers the data blocks to a log splitter. A log splitter demultiplexes the logged data into separate streams based on address.

In short, the above approaches are not without problems. For instance, during suspension of the VM, the cache is sensitive to page faults as the cache is put into a read-only state, as previously explained. Furthermore, large amounts of data may have to be stored for each checkpoint, which causes pressure on the resource utilization of the computing architecture, in particular the data storage facilities of the architecture.

BRIEF SUMMARY OF THE INVENTION

According to a first aspect of the present invention, there is provided a computer system comprising a processor unit arranged to run a hypervisor running one or more virtual machines; a cache connected to the processor unit and comprising a plurality of cache rows, each cache row comprising a memory address, a cache line and an image modification flag; and a memory connected to the cache and arranged to store an image of at least one virtual machine; wherein the processor unit is arranged to define a log in the memory; and the cache further comprises a cache controller arranged to set the image modification flag for a cache line modified by a virtual machine being backed up, but not for a cache line modified by the hypervisor operating in privilege mode; periodically check the image modification flags; and write only the memory address of the flagged cache rows in the defined log.

BRIEF DESCRIPTION OF THE DRAWINGS

Particular embodiments of the present invention will now be described, by way of example only, with reference to the following drawings, in which.

DETAILED DESCRIPTION OF THE EMBODIMENTS

Figure 1:
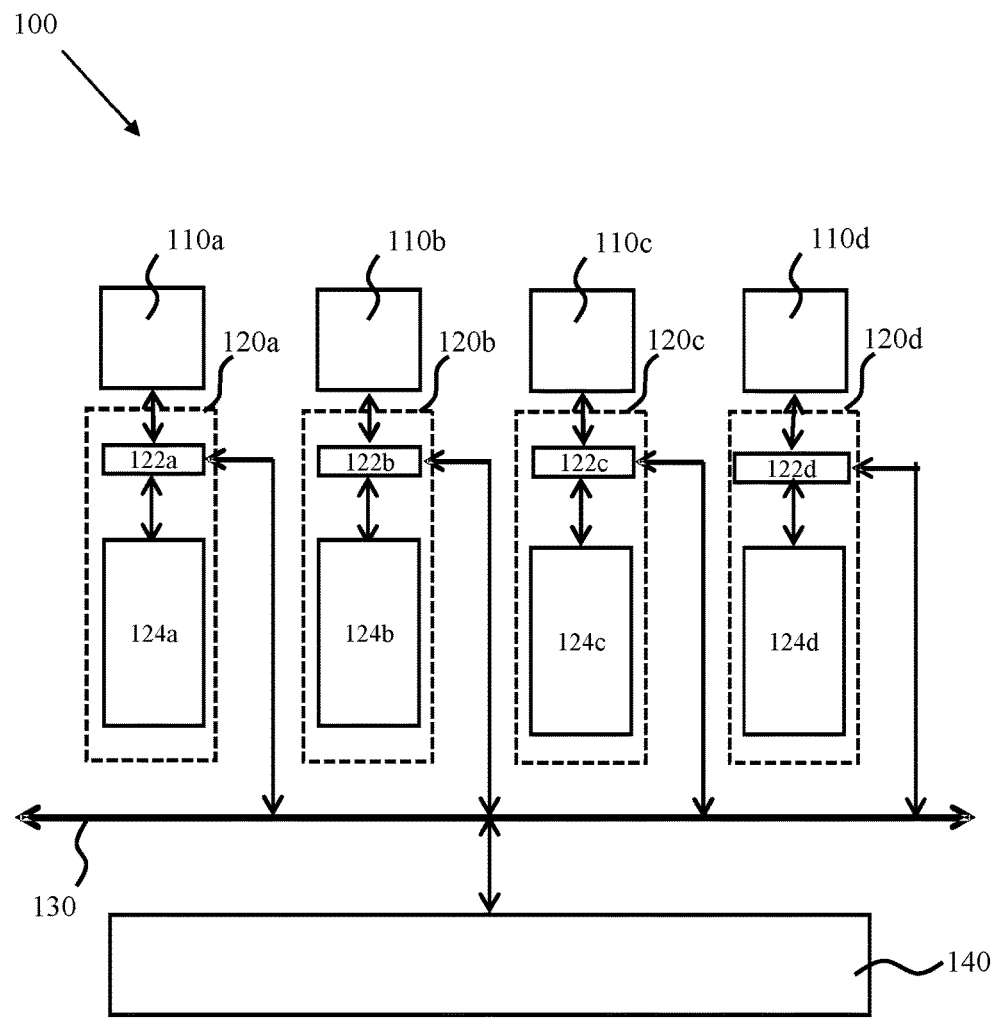
FIG. 1 schematically depicts a computer system according to an embodiment of the present invention.

According to an aspect of the present invention, there is provided a method of operating a computer system comprising a processor unit arranged to run a hypervisor running one or more virtual machines; a cache connected to the processor unit and comprising a plurality of cache rows, each cache row comprising a memory address, a cache line and an image modification flag; and a memory connected to the cache and arranged to store an image of at least one virtual machine; the method comprising the steps of defining a log in the memory; setting the image modification flag for a cache line modified by a virtual machine being backed up, but not for a cache line modified by the hypervisor operating in privilege mode; periodically checking the image modification flags; and writing only the memory address of the flagged cache rows in the defined log.

In the computer system of the present invention, a hypervisor is arranged to host a VM as well as act as a VM image replication manager to create a replica of a VM image in another location, for example in the memory of another computer system. As all changes made to an image of an active VM by the processor unit hosting the VM will travel through its cache, it is possible to simply log the memory address associated with a dirty cache line. To this end, the cache rows include an image modification flag that signal the modification of a cache line by the execution of the VM, and therefore signal a change to the VM image, which has the advantage that the memory addresses of the dirty cache lines can be written to the log without requiring the expulsion of the dirty cache lines from the cache at the same time, which would be the case if the relevant memory addresses would be identified on the basis of a dirty bit tag used to write modified cache lines to the memory of the computer system instead. Hence, the use of an additional bit flag that signals modification of a cache line by execution of a VM ensures that the memory addresses of the thus modified cache lines can be written to the log without at the same time requiring the cache lines to be flushed from the cache, thus significantly reducing the amount of data that needs to be transferred from the cache when updating the log. However, the image modification flag is only set if the change to a cache line is caused by a virtual machine operation that relates to a virtual machine being backed up. If the change to a cache line is caused by a virtual machine that is not been backed up or as the result of the hypervisor operating in privilege mode, then the image modification flag is not set. This reduces the amount of unnecessary data that is backed up at a checkpoint.

Advantageously, the processor unit is arranged to run multiple execution threads, in a technique commonly referred to as "Simultaneous Multithreading (SMT)", and the hypervisor is arranged to maintain a thread mask flagging those threads that relate to one or more virtual machines being backed up and when setting the image modification flag for a cache line modified by a virtual machine being backed up, refers to the thread mask to determine whether to set the image modification flag to determine whether to set the image modification flag for the current cache line being modified. In a particular embodiment, each cache row further comprises a thread ID indicating which execution thread is responsible for modification of the cache line in the respective cache row.

In a particular embodiment, a single bitfield register, called the thread mask, is introduced on each processor unit, with a number of bits equal to the number of hardware threads supported by that unit, and hypervisor-privileged operations added to set those bits. The hypervisor (which knows which virtual machines are running on which hardware threads) sets the associated bits in the thread mask for the hardware threads that are running virtual machines that require checkpoint-based high-availability protection. A new field, thread ID is added alongside the image modification flag on every cache line. It is sufficiently large to contain the ID of the hardware thread that issued the store operation (i.e. two bits if four hardware threads are supported). When a store is performed, the image modification flag is now set in the cache, only if the store was not executed when running in the hypervisor privilege mode and if the thread mask bit corresponding to the currently executing hardware thread is set. As well as setting the image modification flag, these store operations can also write the ID of the hardware thread that issued the store to the cache line's new thread ID field. When cache lines are logged during a cast-out, snoop intervention or cache-clean operation, the contents of the thread ID field associated with the cache line are also written to the log or as an alternative the thread ID directs the log record to a different log, depending on the value of the thread ID, with the processor core capable of storing position and size information for multiple logs. When this alternative is used, it is not necessary to write the thread ID field to the log.

These enhancements allow multiple virtual machines to execute on a single processor unit concurrently, with any number of them running with checkpoint-based high-availability protection. The presence of the thread ID in the logs, coupled with the hypervisor's existing notion of which virtual machines are currently running on which processor cores and hardware threads is sufficient to allow the secondary host (the memory location where the backup image is stored) to update the correct virtual machine memory image on receipt of the logs.

The cache controller typically is further adapted to write the memory address of a flagged cache line in the defined log upon the eviction of said flagged line from the cache to capture flagged changes to the VM image that no longer are guaranteed to be present in the cache during the periodic inspection of the image modification tags.

In a particular embodiment, the computer system is further arranged to update a further image of the virtual machine in a different memory location by retrieving the memory addresses from the log; obtaining the modified cache lines using the retrieved memory addresses; and updating the further image with said modified cache lines, such that the logged memory addresses are used to copy only the altered data of the primary image to the copy of the VM image, which copy may for instance be located on another computer system.

In this manner, VM images may be synchronized without the need to incur additional page faults and reduces the traffic between systems due to the smaller granularity of the data modification, i.e. cache line-size rather than page size and due to the fact that the VM is suspended during image replication, thus obviating the need for page protection. This approach is furthermore page size-agnostic such that larger page sizes can be used than for instance is the case in the Remus approach. Moreover, the additional hardware cost to the computer system is minimal; only minor changes to the cache controller, for example to the cast-out engine and the snoop-intervention engine of the cache controller, and to the cache rows of the cache are required to ensure that the cache controller periodically writes the memory address of the dirty cache line in the log by periodic inspection of the image modification flag during the execution of the VM.

The computer system may replicate data from the primary VM image to a copy in push or pull fashion. In a push implementation, a processor unit from the same computer system, for example the processor unit running the VM or a different processor unit, may be also responsible, under control of the hypervisor, for updating the copy of the image of the VM in the different memory location, which may be a memory location in the memory of the same computer system or a memory location in the memory of a different computer system. In a pull implementation, a processor unit of a different computer system may be adapted to update the copy of the VM image in the memory location on this different computer system by pulling the memory addresses and associated modified cache lines from the computer system hosting the VM.

The cache may include a write-back cache, which may form part of a multi-level cache further including a write-through cache adapted to write cache lines into the write-back cache, wherein only the cache rows of the write-back cache comprise the flag. As by definition the cache lines in a write-through cache cannot get dirty because cache line modifications are also copied to a write-back cache, only the write-back caches need inspecting when periodically writing the memory addresses to the log.

In a particular embodiment, the log which stores the addresses of changed cache lines is a circular buffer and the system comprises a plurality of registers adapted to store a first pointer to a wrap-around address of the circular buffer; a second pointer to the next available address of the circular buffer; a third pointer to an initial address of the circular buffer; and the size of the circular buffer; and the cache controller is adapted to update at least the second pointer following the writing of a memory address in the log. This is a particularly advantageous embodiment of the log, as the size of the log is defined prior to its use, thus avoiding conflicts in (the system) memory, and facilitating monitoring of the fill level of the log by the replication manager such that the replication manager can invoke the synchronization mode for updating the secondary VM if the fill level of the log approaches the capacity of the log, i.e. when the log is almost full. In this embodiment, the processor unit or the cache controller may comprise dedicated registers that are accessible to the cache controller and that allow for the monitoring of the fill level of the circular buffer, for example by the cache controller or by the hypervisor.

In a particular embodiment, each processor unit is configured to deduplicate the memory addresses in the log prior to the retrieval of the addresses from the log. This reduces the amount of time required for synchronizing data between the memories respectively comprising the image of the VM and its copy because it is ensured that the altered data in a logged memory location is copied once only, thus further reducing the amount of time the primary VM is suspended. In this manner, the log is updated with the memory addresses of the modified cache lines without the need to flush the modified cache lines from the cache at the same time, thus providing a method in which VM image replication data is generated at minimal data bandwidth.

The processor unit typically further performs the step of writing the memory address of a flagged cache line in the defined log upon the eviction of said flagged line from the cache to capture flagged changes to the VM image that no longer are guaranteed to be present in the cache during the periodic inspection of the image modification tags.

FIG. 1 schematically depicts a computer system 100. The computer system 100 comprises a plurality of processor units 110 for hosting one or more virtual machines. In FIG. 1, four processor units 110a-110d are shown by way of non-limiting example only; it should be understood that the computer system 100 may comprise any suitable number of processor units. A processor unit is a unit of hardware that is capable of (pseudo-) autonomous execution of a computer program code, such as a processor, microprocessor or a core of a processor or microprocessor comprising a plurality of such cores. Each processor unit 110 can be arranged to run a hypervisor, which is a software component that enables the provision of the virtual machine(s) to external users.

Each processor unit 110 further is connected to and has access to a cache 120, which comprises a cache controller 122 in addition to a pool of entries 124, with each entry including a cache line and one or more tags. Any suitable cache architecture may be used, for example a single cache or several levels of cache, such as a level-1 cache, a level-2 cache and a level-3 cache or suitable subsets thereof. The cache 120 may reside in any suitable location. For instance, the cache 120 may be located on or in the vicinity of the processor unit 110 to ensure a significant reduction in data retrieval latency as is well-known per se.

In the embodiment shown in FIG. 1, each processor unit 110 has access to a dedicated cache 120. Four caches 120a-d are shown by way of non-limiting example only, one for each of the respective processor units 110a-d. However, it should be understood that any suitable configuration may be chosen, for example a configuration in which a processor unit 110 has access to multiple caches 120, which may be organized in a hierarchical structure, for example a combination of a level-1, level-2 and level-3 cache, as previously explained.

Each processor unit 110 is typically communicatively coupled to bus architecture 130 through its respective cache 120, at least at a functional level. This means that any access of data by a processor unit 110 will involve its cache 120, as is commonly the case in such computer systems 100. The exact nature and connectivity of the bus architecture is not particularly relevant to the present invention, and it suffices to say that any suitable bus architecture 130 may be chosen.

The computer system 100 further comprises a memory 140 coupled to the bus architecture 130, which again may take any suitable form, for example a memory integrated in the computer system or a distributed memory accessible over a network. The memory 140 is connected to the caches 120. The memory 140 may be volatile memory or a non-volatile memory. Many other suitable embodiments of such a memory 140 will be apparent to the skilled person. Although not shown, the computer system 100 may comprise additional components such as one or more network interfaces, input ports, output ports and so on, as is of course well-known to the skilled person.

The computer system 100 is adapted to host a one or more virtual machines on the processor units 110, through the use of a hypervisor. A virtual machine (VM) is a software representation of a computing device capable of hosting anything from a single computer program to a complete operating system, and which may be present itself as a separate system to the user of the computer system 100, such that the user has no awareness of the underlying computer system 100. For instance, in the case of the computer system 100 embodying a local area network (LAN) server having a plurality of processors each comprising a number of cores, the user accessing the LAN will be able to engage with the services hosted by the VMs but will be unaware of the underlying server. These concepts are of course well-known per se and will not be explained in further detail for the sake of brevity only.

One of the attractions of virtualization is improved robustness due to the ability to provide failover between VMs, which means that should a VM fail for any reason, a backup VM is available that will continue to provide the VM functionality to the user, without the user being aware that the first VM failed. To this end, a copy of a VM is periodically updated to ensure that the copy accurately represents the actual current state of the original VM in case the original VM exhibits a failure and will have to fail over to the copy, as it is preferable that the one or more users of the VM are unaware of the failover. The original VM will be referred to as the primary VM and its copy will be referred to as the secondary VM.

Such synchronization between the primary VM and the secondary VM requires the temporary suspension of the primary VM to ensure that its state does not change during the synchronization. The duration of such suspension should be kept to a minimum to ensure that the one or more users of the VM are not noticeably affected by the temporary suspension.

To avoid such performance penalties, it is common practice to create differential checkpoints, in which only changes in the state of an entity since the last checkpoint are captured. Such checkpoints may be generated by writing the address and data from a cache line to a secondary memory such as a level-2 cache or the system memory 140 as soon as the data in a cache line is altered, as for instance is disclosed in U.S. Pat. No. 5,893,155 for the purpose of database roll-back. When using such checkpoint generation for VM replication purposes, it has the drawback that a large amount of data may be unnecessarily communicated during operation of the primary VM; for instance, if a cache line of the cache 120 used by the primary VM is updated multiple times during the operation mode of the primary VM, previous versions of the data in the cache line are unnecessarily written to the secondary memory as this 'old' data has become redundant.

Figure 2:
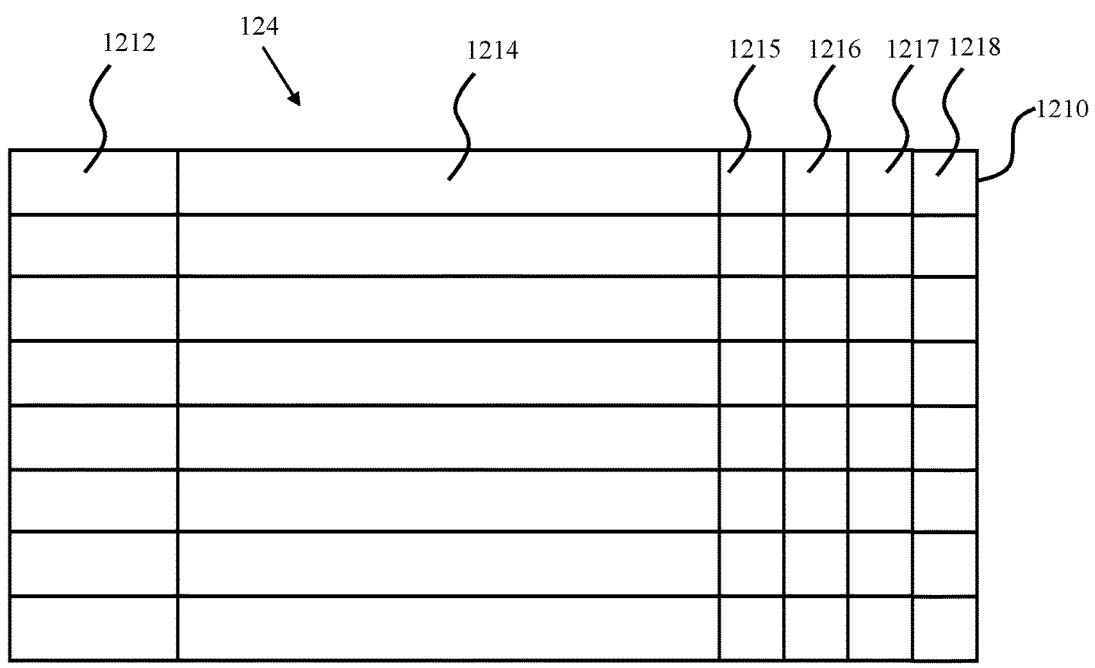
FIG. 2 schematically depicts an aspect of a computer system according to an embodiment of the present invention in more detail.

An example architecture of the data storage part 124 of a cache 120 is shown in FIG. 2. The data storage part 124 comprises a plurality of cache rows 1210, with each cache row 1210 including a tag 1212 which is the address of the data in memory 140, a cache line 1214 and a number of flag bits. The flag bits comprise a valid bit 1215, which signals if the cache line 1214 is still relevant to the processor unit 110, a dirty bit 1216, which signals if the cache line 1214 has been altered such that it needs writing back to the address in memory 140 stored in the tag 1212, an image modification flag 1217 and a thread ID field 1218, which are described in more detail below.

The cache rows 1210 of a cache 120 capable of containing dirty cache lines 1214 include the VM image modification bit flag 1217 that signals whether the cache line 1214 is modified by a processor unit 110 executing a VM that is being backed up. In other words, this flag signals if the modified cache line 1214 forms part of a VM image for which a checkpoint based backup is operating. The cache controller 122 will set both the dirty bit flag 1216 and the VM image modification flag 1217 to true upon a write access of the cache line 1214 by the processor unit 110 during the execution of a VM that is being backed up. The purpose of this will be explained in more detail below.

The processor unit 110 hosting a primary VM typically includes a replication manager, which may be included in the design of the hypervisor, and/or which may be realized in hardware, in software, or a combination of hardware and software. The replication manager is adapted to create a log in the system memory 140 for logging the memory addresses of the cache lines 1214 modified during the execution of the VM. Preferably, the data in the log is only accessible to the replication manager of a processor unit including other processor units 110 of the computer system 100 or processor units 110 of another computer system 100 as will be explained in more detail later.

Figure 3A:
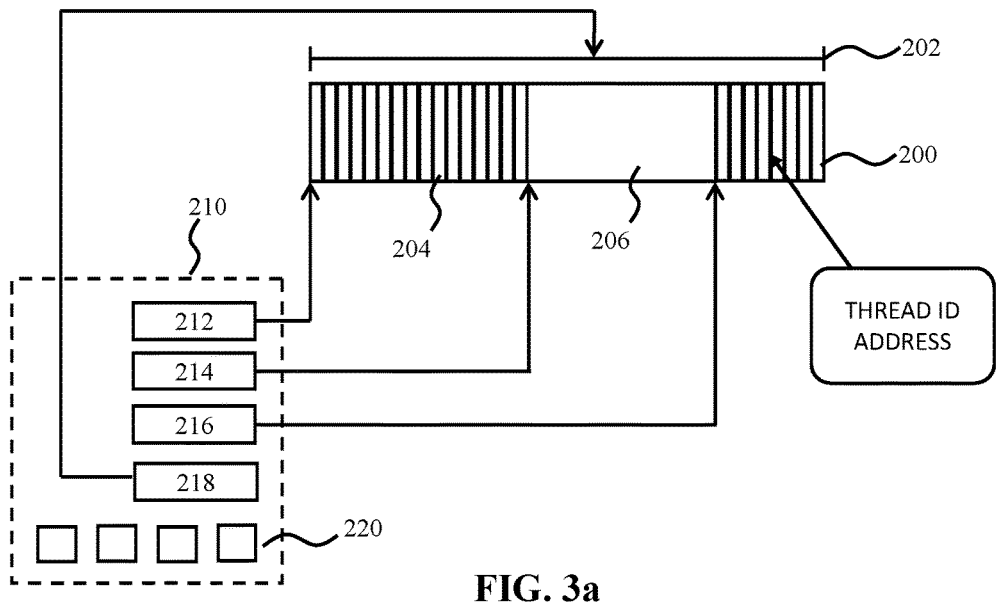
FIGS. 3a and 3b schematically depict another aspect of a computer system according to an embodiment of the present invention in more detail.

In a particular embodiment, the memory address log in the memory 140 has a defined size and allocation to avoid corruption of the memory 140. Any suitable implementation of such a log may be chosen. A particularly suitable implementation is shown in FIG. 3a. In this embodiment, the log is defined as a circular buffer 200 in the system memory 140, and has a size 202 defined by the replication manager, which may be part of the hypervisor of the processor unit 110. The log 200 is designed to comprise a plurality of memory addresses in memory locations 204. A portion 206 is shown to indicate unused memory locations in the log 200.

In order to facilitate the management of the log 200 during the execution of a VM on the processor unit 110, the computer system 100 includes a set of registers 210 including a first register 212 in which the base address of the circular buffer 200 is stored, a second register 214 in which the next available address of the circular buffer is stored, a third register 216 in which the starting point of the circular buffer 200 is stored and a fourth register 218 in which the size 202 of the circular buffer 200 is stored. The set of registers 210 may be located on the respective processor unit 110. Alternatively, the set of registers 210 may form part of the cache controller 122. The registers 210 also include a thread mask 220, which contains a flag for each thread being executed by the respective processor unit 110. The thread mask 220 indicates those threads that relate to a virtual machine that is being backed up. During initialization of the log 200, the replication manager of the processor element 110 will populate the registers 212, 214, 216 and 218 and the thread mask 220 with the appropriate values after which execution of the VM(s) on the processor unit 110 may start or resume.

The hardware architecture of the cache controller 122 has been extended such that upon the temporary suspension of a VM by the hypervisor of its processor unit 110 to facilitate the replication of the VM image and in response to a signal from the processor unit 110 requesting that the memory addresses in the tags 1212 of the modified cache lines 1214 should be made available for replication of the VM image, the cache controller 122 is adapted to traverse the cache 120 and inspect the VM image modification bit flags 1217, and write the memory addresses of the cache lines 1214 and the thread ID 1218 to the log 200 of the cache lines 1214 that have a VM image modification flag 1217 set to true, and to clear the VM modifications flags 1217 once the corresponding memory addresses have been written to the log 200.

FIG. 3a shows an arrangement of registers 210 for a processor unit 110 that supports four hardware threads in which log records are emitted to a single log 200, with each record being tagged with the thread ID 1218. The per-hardware-thread processor privilege register, which indicates whether a hardware thread is running in hypervisor mode or not is not shown, as it is present in existing processor implementations. Since the address 204 stored in the log 200 is the address of a cache line, any given cache line address can be represented in 64 bits with the least-significant bits spare to contain the thread ID, so a log record can be wholly contained within 64 bits. As described above, cast-outs, snoop interventions and cache clean operations will emit all cache lines with the image modification flag 1217 set to the in-memory log, with the log 200 containing the thread ID and address of the entry.

Figure 3B:
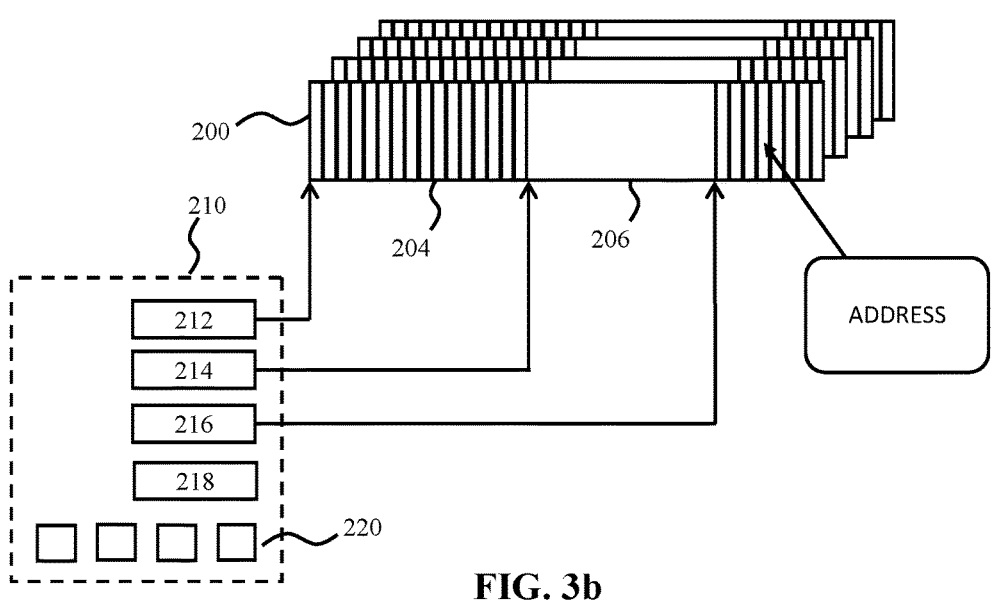

When using an alternative mechanism, shown in FIG. 3b, in which different hardware threads log to different buffers 200, there will be one set of base, producer head, barrier and size registers for each hardware thread. It is not necessary to use an explicit thread mask register, since a null value (such as a zero size) can be used in the existing registers to indicate that backup is disabled for that hardware thread. Cache lines that fit the criteria (backup enabled for the hardware thread, and not running in hypervisor privileged mode) will be marked in the cache with the image modification flag 1217 set and the thread ID indicated, and on cast-out, snoop intervention or cache clean will be written out to one of four logs, with the destination in memory identified by first examining the thread ID associated with that cache line, and then writing the cache line address to the address specified by the producer head register of the appropriate hardware thread.

Under both models, any change to the hardware thread-to-VM assignment (for example scheduling a VM to run on a hardware thread on which it was not previously running) would require a cache-clean operation to ensure that any image modification flag data for the virtual machine that was previously running on the hardware thread had been pushed out to the log prior to the switch taking place, and the hypervisor should note at which point in the log the virtual machine switched from one to another, so that the processor unit 110 is able to communicate these memory changes to the secondary host in terms of the virtual machine that has undergone modification, rather than the hardware thread that caused the modification.

As a further optimization, the cache clean operation could be extended to only target specific thread IDs, allowing the operation to selectively clean only the cache lines associated with hardware threads that are being reassigned to another virtual machine. This would reduce the number of unnecessary log entries that were produced if, for example, three hardware threads were running code for virtual machine 0, and a fourth running code for virtual machine 1. A reassignment to have the fourth hardware thread run code for virtual machine 2 only requires that cache lines associated with the fourth hardware thread been written to the in-memory buffer before it can start executing code for virtual machine 2.

Figure 4:
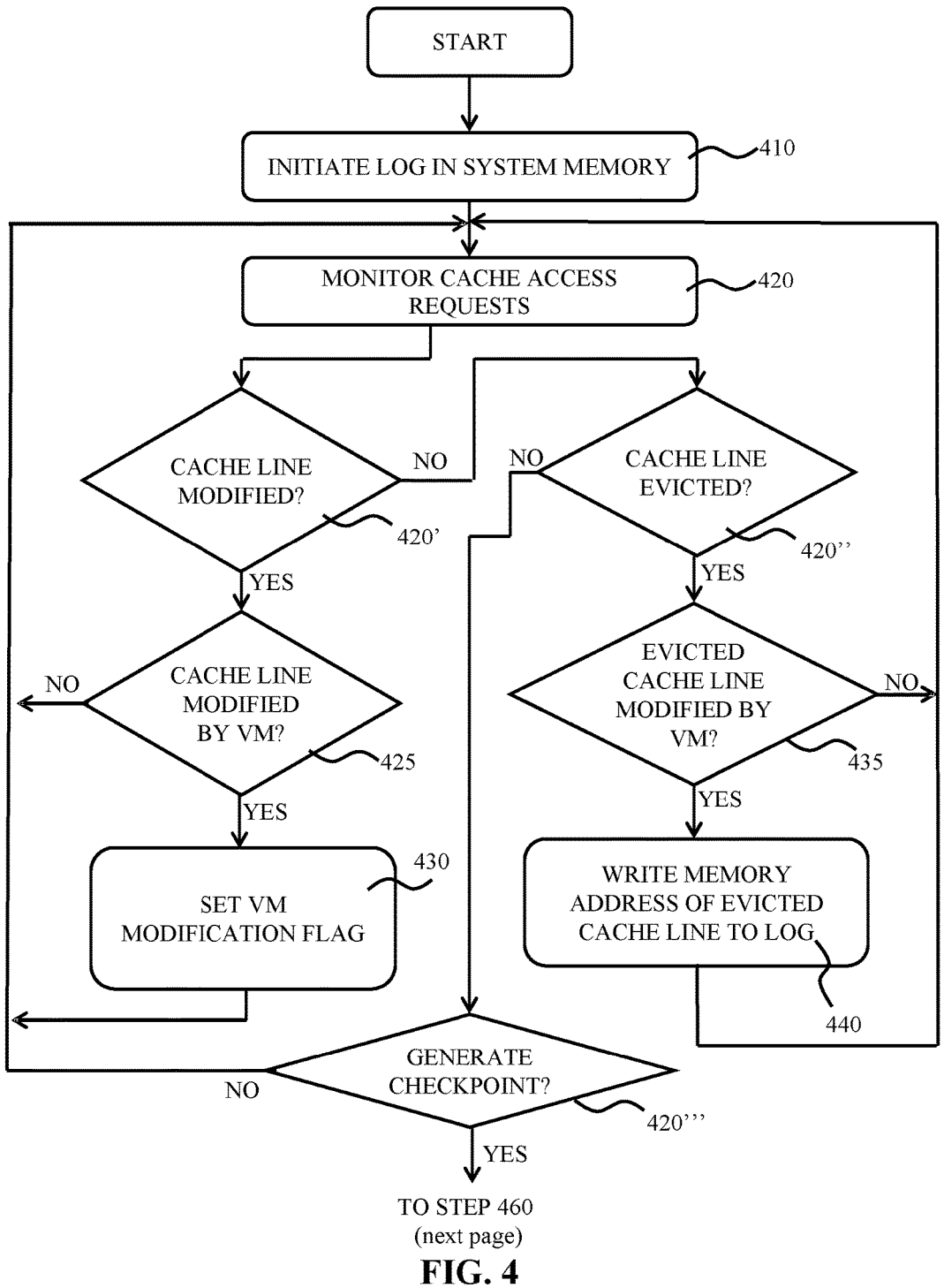
FIG. 4 schematically depicts a flow chart of an aspect of a method of updating computer system according to an embodiment of the present invention.
Figure 4:
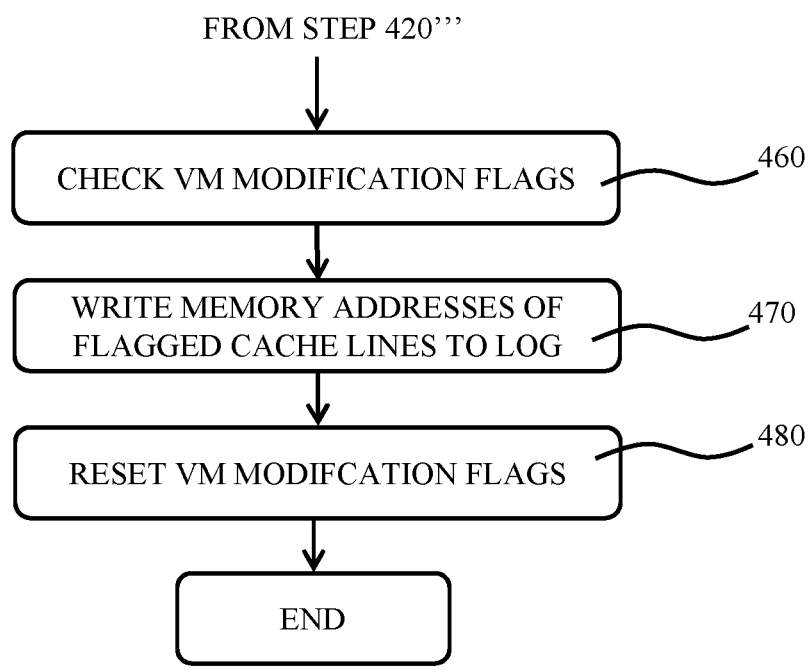

The process of setting the image modification flag 1217 is explained in more detail with the aid of FIG. 4, which shows a flowchart of an example embodiment of such an updating method. After starting the method, the replication manager creates the log in the system memory 140 in step 410 and stores the relevant values of the base address, initial address (starting point), next available address and log size in the registers 212, 214, 216 and 218 as previously explained. The thread mask 220 is also populated, indicating which threads being executed by the processor unit 110 relate to virtual machines being backed up. The cache controller 122 subsequently monitors and handles in step 420 accesses to the cache lines in the line memory 124 of the cache 120 by the processor unit 110 (or any other processor unit).

In addition, the cache controller 122 performs a number of checks in step 420, which checks have been identified in FIG. 4 as steps 420', 420" and 420''' respectively. In step 420', the cache controller 122 checks if the cache line access has caused a modification of the accessed cache line, in which case the cache controller set the flag 1216 signaling the cache line as being dirty, as is well-known per se. In case of such a modification of a cache line, the method proceeds from step 420' to step 425, in which the cache controller 122 further checks if such a dirty cache line has been generated during the execution of a VM that is being backed up, via reference to the thread mask 220. If this is the case, the cache controller 122 also sets the VM image modification flag 1217 signaling the cache line as being a dirty cache line belonging to a VM image to be backed up in step 430 before returning to step 420. Any hypervisor actions in privilege mode also do not result in the image modification flag 1217 being set.

If the cache access does not lead to the modification of a cache line but instead causes the eviction of a cache line from the cache 120, as checked in step 420", the method proceeds from step 420" to step 435 in which the cache controller 122 checks if a cache line to be evicted from the cache 120 is flagged as being modified by the VM, i.e. checks if the VM image modification flag 1217 of the cache line to be evicted is set to true. In case such a modified cache line is evicted from the cache, for example because of a fresh cache line requested by the processor unit 110 forcing the eviction of a modified stale cache line from the cache 120 or because of a further processor unit 110 requesting sole access to a modified cache line residing in the cache 120, the cache controller 122, for example using the cast-out engine or the snoop-intervention engine, writes the memory address of the evicted cache line to the log 200 in step 440, to ensure that this modification is captured in the log 200, after which the method returns to step 420. Obviously, when replacing such a cache line 1214 in the cache 120, its flags 1215, 1216 and 1217 are cleared or reset to the values that are appropriate for the fresh cache line. In case the cache access request does not involve the eviction of a cache line, it is further checked in step 420''' if the cache access request is a request to generate a VM checkpoint. Such a request may originate from the replication manager of the processor unit 110 hosting the VM, or alternatively may originate from a replication manager of another processor unit responsible for replicating the changes to the primary VM image during the execution of the VM in a secondary VM image. In a particular embodiment, step 420''' occurs periodically, at regular intervals such as every 25 ms, to ensure that the secondary VM image is regularly updated. Any suitable checkpoint generation frequency may be chosen.

It is noted for the avoidance of doubt that the checks 420', 420" and 420''' are shown as a sequence of steps for the sake of clarity only. It should be understood that the cache controller 122 does not have to perform each of these checks to decide what cause of action should be taken next. It is for instance equally feasible that the cache controller 122 may immediately recognize that a cache line eviction or a VM image replication is required, in which case the cache controller 122 may proceed from step 420 directly to step 435 or step 460 respectively.

Upon detecting the checkpoint generation instruction in step 420''', the cache controller 122 traverses the cache 120 and inspects in step 460 the VM image modification flag 1217 of all cache rows 1210 that comprise such a flag. Upon detection of a VM image modification flag 1217 set to true, the cache controller retrieves the memory address of the associated cache line 1214 from tag 1212 and writes the retrieved memory address into the log 200 in step 470. To this end, the cache controller 122 retrieves the pointer of the next available address in the log 200 from the register 214, for example by fetching this pointer or requesting this pointer from the replication manager of the processor unit 110.

At this point, the pointer in register 214 will need updating to ensure that no memory addresses are overwritten. The pointer may be updated by the cache controller 122 or alternatively by the replication manager or the hypervisor, of the processor unit 110, although the latter implementation may negatively impact on the performance of the hypervisor in case cache lines are frequently expelled, which is the case in most operating scenarios in which caches are utilized. In a particular embodiment, this updating step comprises moving the pointer forward by offsetting the pointer presently stored in the register 214 with the size of the stored memory address and writing this offset value in the register 214.

It is furthermore necessary to check if the next available address in the log 200 to be stored in register 214 should be wrapped around to the base address. In an embodiment, the cache controller 122 or the replication manager of the processor unit 110 will check if the next available address equals the base address+size of the log 200 as this indicates that the boundary of the address range of the log 200 in the system memory 140 has been reached, and will set, i.e. wrap around, the next available address to the base address if this is the case.

After completing step 470, the cache controller 122 subsequently resets the VM image modification flag to false in step 480. Step 480 may be executed at any suitable point in time, for example after each write action to the log 200, or after all write actions to the log 200 have been completed.

At this point, it is reiterated that any suitable cache architecture may be used for the cache 120. It is known per se that such architectures may include different types of caches, such as a combination of a write-through cache and one or more write-back caches. A write-through cache retains data in the cache and at the same time, synchronously, pushes the data into a next level of the cache. This provides fast access times for subsequent reads of the cache lines 1214 by the processor unit 110 at the cost of slower write actions, as the writer has to wait for the acknowledgement that the write action has been completed in the (slower) next level cache. By definition, a write-through cache does not contain dirty cache lines, as the cache lines are 'cleaned up' in one of the next level caches. Hence, where an embodiment of the present invention includes a cache architecture including a write-through cache, the VM image modification flags 1217 may be omitted from the write-through cache and may be added to only those caches that can contain dirty cache lines, that is the write-back caches that do not push modified cache lines to a next level cache but are responsible for managing data coherency between caches and memory 140 as a consequence. Step 460 is typically applied to all caches in the cache architecture that have cache rows 1210 containing the VM image modification flag 1217, therefore all write-back caches.

At this point, the replication manager may trigger the replication of the VM image in memory 140 to another memory location, such as another memory or cache, by accessing the log 200, fetching the addresses stored in the log 200, fetching the cache lines stored at the fetched addresses and updating a copy of the VM image in the other memory location with the fetched cache lines, as previously explained.

It should be understood that the replication manager triggering the flush of the cache line addresses and the subsequent update of the secondary image of the VM does not have to be the replication manager of the processor unit 110 running the VM. In an embodiment, the replication manager of another processor unit 110 of the computer system 100 may be in charge of this update process.

Generally, the embodiments in which the processor unit in charge of the VM image update process resides on the same computer system 100 as the processor unit 110 running the VM can be seen as embodiments in which the modified cache lines are pushed to another memory location. In an alternative embodiment, modified cache lines may be pulled from their primary memory location by a processor unit on a separate computer system, such as a processor unit responsible for hosting a secondary version of the VM, i.e. a processor unit to which the VM fails over, for example in case of a hardware failure of the processor unit hosting the primary VM. In this embodiment (as well as in the embodiment in a different processor unit of the computer system hosting the VM is in charge of the VM image replication process), the processor unit 110 hosting the VM forwards data relevant to the replication of its VM image in memory 140 including the values stored in the registers 212, 214, 216 and 218 to the replication manager of another processor unit, for example another processor unit in a different computer system, to allow this further replication manager to retrieve the altered cache lines using the addresses in the log 200 as will be explained in more detail later.

In a particular embodiment, the replication manager is further adapted to check if the next available address in register 214 is equal to the initial address stored in register 216 prior to writing a cache line address to the log 200. If the pointers in registers 214 and 216 are the same, this signals that the log 200 is full and that no further addresses can be written to the log 200 as this would cause some of the addresses in the log 200 to be overwritten, thus causing incomplete replication of the primary or original VM image to its copy (the secondary VM image).

If a full log 200 is detected in this manner, the replication manager prevents such a replication error by initiating an immediate failover of the primary VM to a secondary VM hosted on another computer system or by initiating a complete resynchronization of all memory associated with the primary VM and the secondary VM. It will be understood such emergency measures are generally undesirable for performance reasons, such that it is important that the replication manager creates a log 200 that is large enough to store all cast-out memory addresses during the interval between the creation of two checkpoints.

Upon writing the memory addresses of the modified cache lines 1214 in the log 200 in step 470, the method may further comprise the optional step of deduplicating addresses in the log 200 to remove multiple instances of the same address in the log 200. This for instance can occur if the frequency at which memory addresses are written to the log 200 is higher than the frequency at which the memory addresses in the log 200 are used to update a secondary VM image.

At this point, it is noted that the process of FIG. 4 has been described assuming that a primary VM is hosted by a single processor unit 110. It is emphasized that this is by way of non-limiting example only. It is for instance equally feasible that a VM is hosted by several processor units 110, for example several microprocessor cores, in which case several logs 200 (one for each core) may be maintained that track different modifications to the VM image in memory 140. In such a scenario, the optional deduplication step may for instance be performed over all logs 200 such that a memory address occurs only once in the combined logs 200 to reduce the amount of data that needs to be copied to the secondary VM during a differential checkpoint generation.

As will be understood by the skilled person, the checkpoint generation may further require synchronization of other relevant states between the primary and secondary VMs, for example the state of the CPU, I/O involving disk(s) and network and so on. As such synchronization is known per se, this has not been described in further detail for the sake of brevity only.

The flowchart of FIG. 4 describes an example embodiment of a first operating mode of a processor unit 110, which may be referred to as a producer mode in which the processor unit 110 produces the relevant data required for the replication of the image of the VM in the memory 140 to a copy of this image in, for example, the memory of another computer system. A processor unit 110 can also operate in a second operating mode, in which it does not host a VM but is instead responsible for replicating the image of a primary VM. This second operating mode may be referred to as a consumer mode, as a processor unit 110 in this mode is adapted to consume the modified cache lines in the VM image produced by a processor unit 110 executing the VM in its first operation mode or producer mode.

For instance, a further processor unit 110 of the computer system 100 including the processor unit 110 hosting the VM may be responsible for updating a replica of the VM image in a further location, for example, a memory of another computer system. Alternatively, the processor unit 110 hosting the VM may switch between operating modes to assume responsibility for updating this replica. In yet another embodiment, a processor unit of another computer system, for example the computer system on which the replica is stored, is responsible for updating this replica of the VM image.

The update of the VM image replica ensures that a processor unit 110 of a computer system 100 storing the replica in its memory can take over execution of the VM upon a hardware failure in the computer system 100 hosting the primary VM, leading to the termination of the execution of the primary VM on this system.

In an alternative embodiment, the second operating mode is not a separate operating mode but forms part of the first operating mode, in which case the processor unit 110 responsible for the execution of the primary VM also is responsible for updating the replica of the VM in the further memory location.

It should be understood that in a computer cluster comprising multiple computer systems 100, some processor units 110 may be in producer mode (i.e. VM hosting mode) whilst other processor units 110 are in consumer mode (i.e. in VM image replication mode). Even a single computer system in such a cluster may comprise processor units 110 in producer mode as well as in consumer mode, as previously explained. In an embodiment, the replication manager, may control whether a processor unit 110 is in producer mode or consumer mode, for example by setting a hardware flag for the processor unit 110 such that it can be recognized in which mode a processor unit 110 is operating.

Figure 5:
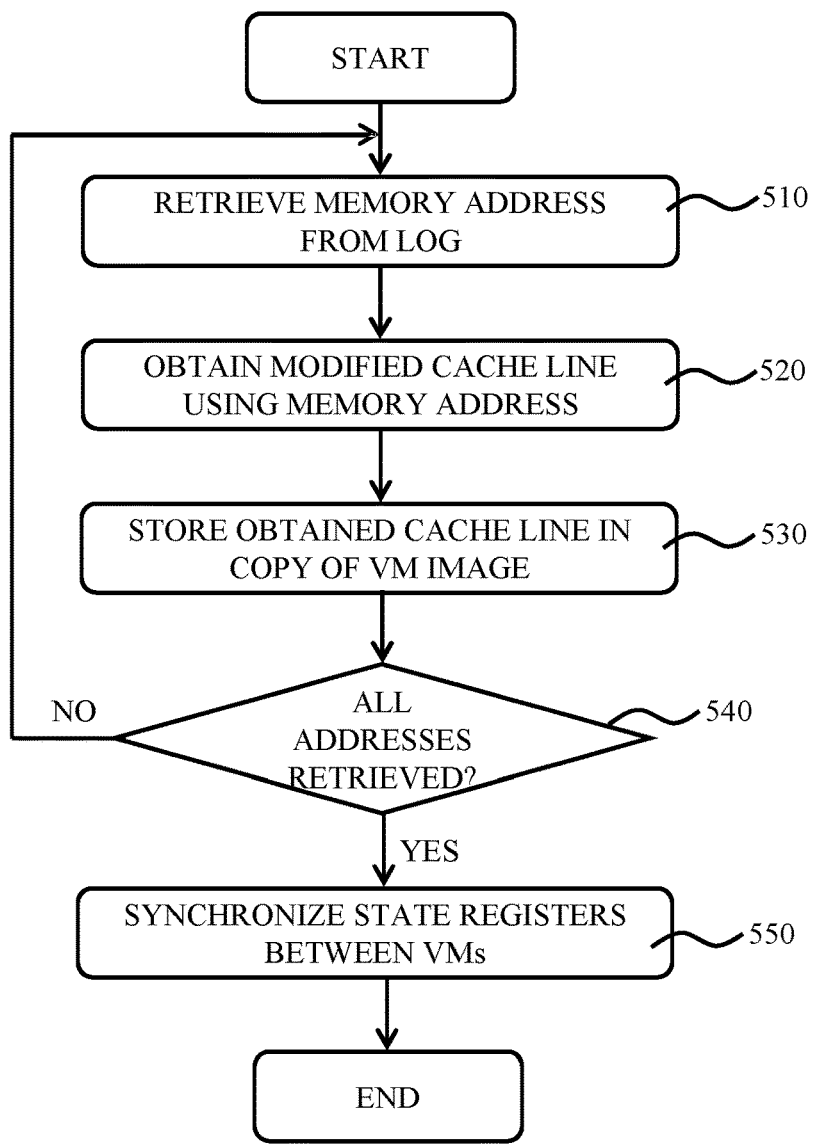
FIG. 5 schematically depicts a flow chart of another aspect of a method of updating computer system according to an embodiment of the present invention.

FIG. 5 depicts a flow chart of the method steps performed during such a second operating mode of a processor unit 110. In the consumer mode, a processor unit 110, for example the replication manager of the processor unit 110, receives the relevant information from the replication manager of the processor unit 110 in producer mode, such as the contents of the registers 212, 214, 216 and 218 that will allow the replication manager of the consumer processor unit 110 to access the memory 140 of the computer system 100 including the producer processor unit 110. The replication manager of the producer processor unit 110 may volunteer the relevant information or may provide the relevant information upon a request thereto by the replication manager of the consumer processor unit 110. Obviously, in an embodiment where the processor unit 110 hosting the VM also acts as the processor unit responsible for updating the secondary VM image, the above step may be omitted.

Upon retrieving the relevant information, the consumer processor unit 110 retrieves the memory addresses stored in the log 200 created by the replication manager of the producer processor unit 110 hosting the primary VM in step 510, and obtains the modified cache lines identified by the memory addresses in step 520. To this end, the consumer processor unit may send a data retrieval request over the bus architecture 130. Such requests are noticed by the cache controllers 122 of the computer system 100, for example by the snoop-intervention engines of the cache controllers 122, which will fetch the cache line 1214 from the cache 120 if the memory address in the data retrieval request matches a memory address in one of the tags 1212 of the cache rows 1210 of the cache 120. The requesting processor unit 110 will typically await the response from a cache controller 122 of a further processor unit 110 for a defined period of time, after which the cache controller 122 of the requesting processor unit 110 will fetch the cache line from the memory 140, as a non-response from the other cache controllers 122 will mean that the cache line 1214 no longer resides in cache but has been cast from the cache 120 instead. The handling of such data retrieval requests in a computer system 100 comprising multiple processor units 110 and caches 120 is of course well known per se, and it should be understood that any suitable data retrieval protocol may be applied without departing from the teachings of the present invention.

The consumer processor unit 110 subsequently updates the copy of the VM image accordingly in step 530 by inserting the obtained modified cache line 1214 in the appropriate location of the VM image copy. This process is repeated until all addresses have been retrieved from the log 200 as checked in step 540, after which other state registers, if any, for example state registers of the CPU as previously explained, may be replicated as shown in step 550. At this point, the consumer processor unit 110 may signal the producer processor unit 110 hosting the primary VM that replication is complete, upon which the producer processor unit 110 hosting the primary VM, for example its hypervisor, will terminate the suspension of the primary VM and reinitialize the log 200, resetting one or more of the registers 212, 214 and 216 in the cache management module 122.

It should be immediately apparent to the skilled person that various modifications may be possible to the method shown in FIG. 5 without departing from the teachings of the present invention. For instance, the consumer processor unit 110 may have permission to deduplicate the addresses in the log 200 of the producer processor unit 110 hosting the primary VM prior to retrieving the memory addresses from the log 200 in step 510.

In another embodiment, a processor unit 110 in the second operating mode, i.e. consumer mode, is adapted to speculatively process the log 200 of a processor unit 110 in the first operating mode, i.e. producer mode. This embodiment is for instance useful when the consumer processor unit does not trigger the cache controller 122 of the producer processor unit to write the modified cache line addresses to the log 200, for example in case the producer processor unit hosting the VM periodically triggers the update of the log 200. This has the advantage that the duration of the suspension of the primary VM can be further reduced as part of the log 200 will already have been processed by the consumer processor unit 110 when the producer processor unit 110 suspends the VM following the request to generate a checkpoint in step 420'''.

Figure 6:
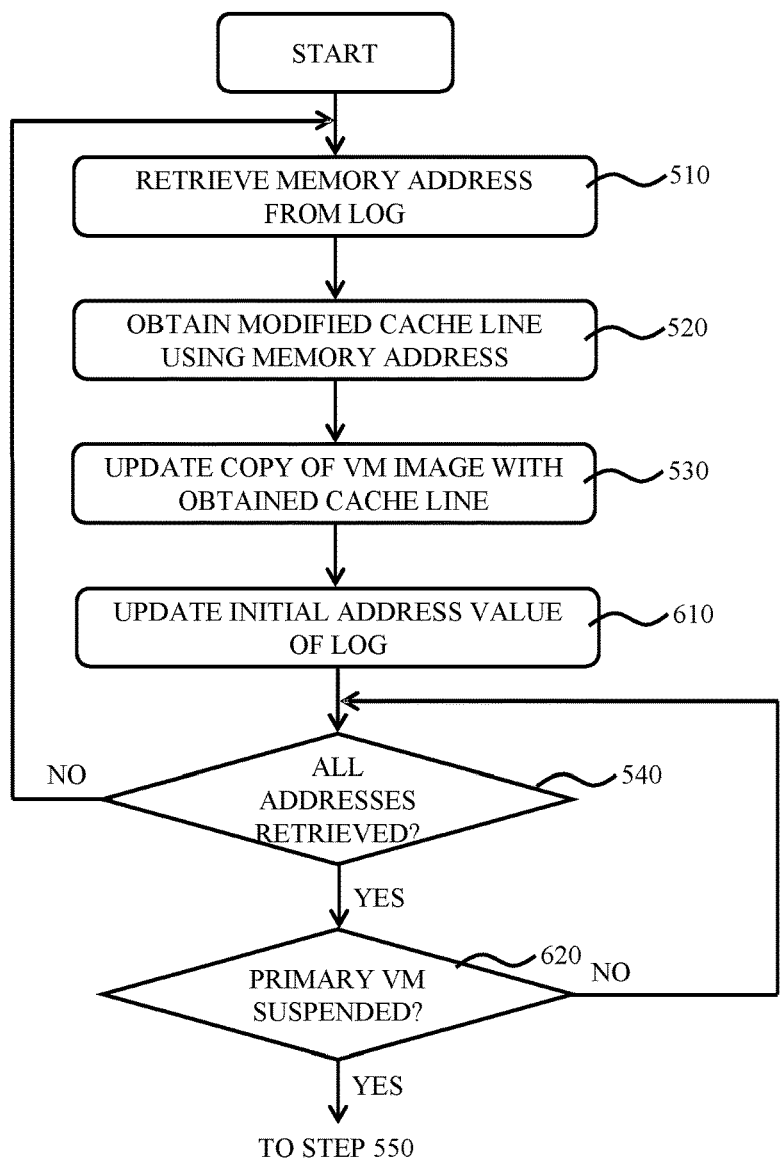
FIG. 6 schematically depicts a flow chart of another aspect of a method of updating computer system according to another embodiment of the present invention.

An example flowchart of this embodiment is shown in FIG. 6. In the process of FIG. 6, several steps are identical to the method of FIG. 5, and these steps will therefore not be explained again for the sake of brevity. In steps 510, 520 and 530 of FIG. 6, the consumer processor unit 110 retrieves a memory address from the log 200 of the processor unit 110 hosting the primary VM, retrieves the data from the memory 140 in the computer system 100 of the producer processor unit 110 and updates the secondary VM image as previously explained. In additional step 610, the consumer processor unit 110 invokes the update of the initial address value of the log 200 as stored in register 216 associated with the producer processor unit 110 hosting the primary VM. This may be achieved in any suitable way, for example by providing the replication manager of the consumer processor unit 110 with write privileges to update this register or by the consumer processor unit 110 instructing the replication manager of the producer processor element 110 to update this register value accordingly.

Step 610 ensures that the available space in the log 200 of the processor unit 110 hosting the primary VM is kept up-to-date, as the addresses already retrieved by the consumer processor unit 110 may be overwritten, as indicated by the change in the initial address stored in the register 216 associated with the producer processor unit 110 hosting the primary VM to the first address in the log 200 not yet processed by the consumer processor unit 110. This therefore reduces the risk of the log 200 becoming full prematurely as the capacity of the log 200 is effectively increased by the speculative processing of the log 200 by the consumer processor unit 110. When the primary VM becomes suspended, as checked in step 620 and all addresses have been retrieved from the log 200, the method may proceed to step 550 as previously explained in the detailed description of FIG. 5.

In an alternative embodiment (not shown), as soon as the primary VM becomes suspended, step 610 may be omitted from the process of FIG. 6, as it is no longer necessary to update the initial address value of the log 200 as stored in register 216 associated with the producer processor unit 110 hosting the primary VM, as no further addresses will be written to the log 200 and the log 200 will be re-initialized prior to the reactivation of the primary VM.

Figure 7:
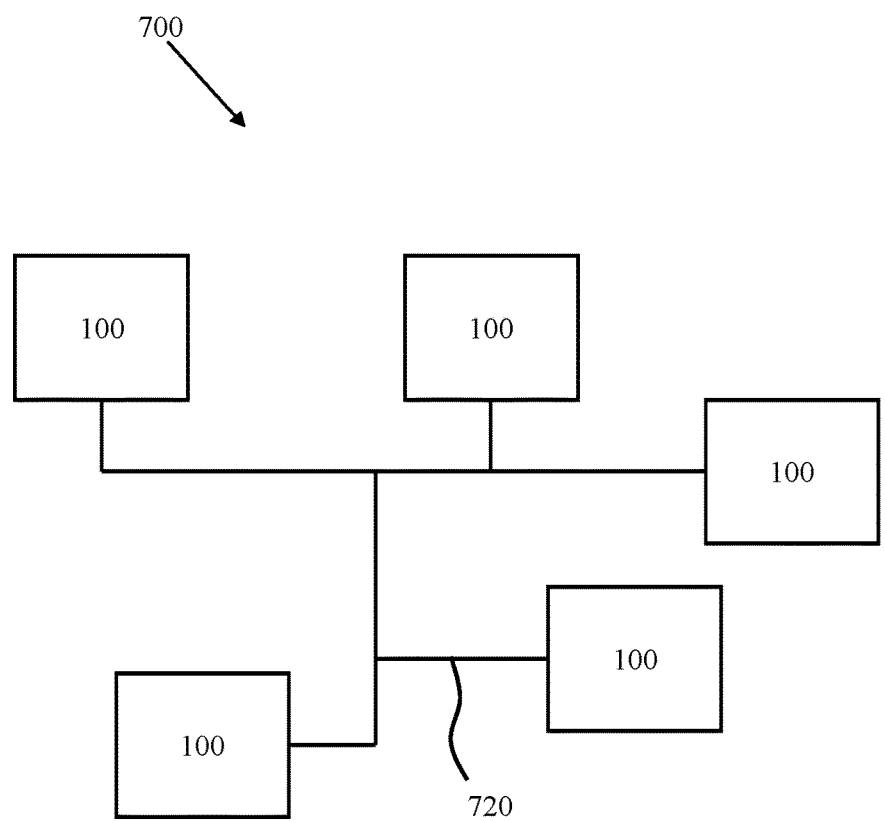
FIG. 7 schematically depicts a computer cluster according to an embodiment of the present invention.

FIG. 7 schematically depicts a computer cluster 700 that comprises a plurality of computer systems 100, which are communicatively coupled to each other via a network 720. The network 720 may be any suitable data communication network, for example a wired or wireless local area network, a wireless or wired wide area network, the Internet and so on. The computer cluster 700 is typically adapted to host a plurality of virtual machines on the processor units 110 of the various computer systems 100 to be utilized by the users of the computer cluster 700. The computer cluster 700 benefits from the VM replication principles described above in that multiple up-to-date or mirror images of a VM may be generated in the respective memories 140 of at least some of the various computer systems 100 such that rapid VM failover can be provided with little overhead.

It should be understood that in the context of the present invention, a computer system is to be interpreted as a device that includes a collection of processor elements that can be utilized in unison. This does not necessarily equate to a single physical entity; it is equally feasible that a computer system is distributed over several physical entities, for example different boxes, or that a single physical entity includes more than one computer systems, for example several separate groups of processor units.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer system for virtual machine backup, the computer system comprising:
a processor unit arranged to run a hypervisor running one or more virtual machines;
a cache connected to the processor unit and comprising a plurality of cache rows, each cache row comprising a memory address, a cache line and an image modification flag, wherein the image modification flag indicates whether a virtual machine being backed up has modified the cache line; and
a memory connected to the cache and arranged to store an image of at least one virtual machine, wherein the processor unit is arranged to define a log in the memory, and the cache further comprises a cache controller arranged to:
in response to a determination that a virtual machine that modified the cache line is being backed up, set, in the cache, the image modification flag for the cache line modified by the virtual machine being backed up, wherein the image modification flag is not set if the cache line is modified by a virtual machine not being backed up;
and
write only the memory address of the cache rows flagged with the image modification flag in the defined log.

2. The computer system of claim 1, wherein the cache controller is further arranged to write the memory address of a flagged cache line in the defined log upon the eviction of the cache row flagged with the image modification flag from the cache.

3. The computer system of claim 1, wherein the hypervisor is further arranged to update a backup image of a virtual machine in a different memory location by:
retrieving the memory addresses from the log;
obtaining the modified cache lines using the retrieved memory addresses;
updating the backup image with the modified cache lines; and
clearing the image modification flags for cache rows containing the modified cache lines.

4. The computer system of claim 1, wherein the processor unit is arranged to run multiple execution threads and the hypervisor is arranged to maintain a thread mask flagging those threads that relate to one or more virtual machines being backed up and when setting the image modification flag for a cache line modified by a virtual machine being backed up, refers to the thread mask to determine whether to set the image modification flag for the current cache line being modified.

5. The computer system of claim 4, wherein each cache row further comprises a thread ID indicating which execution thread is responsible for modification of the cache line in the respective cache row.

6. A computer program product for virtual machine backup in a computer system, computer system comprising:

a processor unit arranged to run a hypervisor running one or more virtual machines;

a cache connected to the processor unit and comprising a plurality of cache rows, each cache row comprising a memory address, a cache line and an image modification flag, wherein the image modification flag indicates whether a virtual machine being backed up has modified the cache line; and a memory connected to the cache and arranged to store an image of at least one virtual machine;

the computer program product comprising a non-transitory computer readable storage medium having program instructions embodied therewith, the program instructions executable by a computer to cause the computer to:

define a log in the memory;

in response to a determination that a virtual machine that modified the cache line is being backed up, set, in the cache, the image modification flag for the cache line modified by the virtual machine being backed up, wherein the image modification flag is not set if the cache line is modified by a virtual machine not being backed up; and write only the memory address of the cache rows flagged with the image modification flag in the defined log.

7. The computer program product of claim 6 wherein the program instructions are executable by a computer to cause the computer to write the memory address of a flagged cache line in the defined log upon the eviction of the cache row flagged with the image modification flag from the cache.

8. The computer program product of claim 6 wherein the program instructions are executable by a computer to cause the computer to update a backup image of a virtual machine in a different memory location by:

retrieving the memory addresses from the log;

obtaining the modified cache lines using the retrieved memory addresses;

updating the backup image with the modified cache lines; and clearing the image modification flags for cache rows containing the modified cache lines.

9. The computer program product of claim 6, wherein the processor unit is arranged to run multiple execution threads; and wherein the program instructions are executable by a computer to cause the computer to maintain a thread mask flagging those threads that relate to one or more virtual machines being backed up and when setting the image modification flag for a cache line modified by a virtual machine being backed up, referring to the thread mask to determine whether to set the image modification flag for the current cache line being modified.

10. The computer program product of claim 9, wherein each cache row further comprises a thread ID indicating which execution thread is responsible for modification of the cache line in the respective cache row.

* * * * *